United States Patent
Åhgren et al.

(10) Patent No.: US 10,129,408 B1
(45) Date of Patent: Nov. 13, 2018

(54) RESIDUAL ECHO DETECTION BASED ON NON-CAUSALITY

(71) Applicant: Google Inc., Mountain View, CA (US)

(72) Inventors: Per Åhgren, Knivsta (SE); Ivo Creusen, Stockholm (SE); Tina le Grand, Järfälla (SE)

(73) Assignee: GOOGLE LLC, Mountain View, CA (US)

( * ) Notice: Subject to any disclaimer, the term of this patent is extended or adjusted under 35 U.S.C. 154(b) by 71 days.

(21) Appl. No.: 15/290,959

(22) Filed: Oct. 11, 2016

(51) Int. Cl.
 *H04M 9/08* (2006.01)
 *H04B 3/23* (2006.01)

(52) U.S. Cl.
 CPC ............ *H04M 9/082* (2013.01); *H04B 3/237* (2013.01)

(58) Field of Classification Search
 CPC .... G10L 21/0232; H04M 9/082; H04M 3/002
 USPC ........ 379/3, 406.01, 406.05, 406.08, 406.06; 381/59, 66; 455/569.1, 570; 348/14.07; 370/289; 704/227
 See application file for complete search history.

(56) References Cited

U.S. PATENT DOCUMENTS

| | | | | |
|---|---|---|---|---|
| 5,008,923 A * | 4/1991 | Kitamura | ................ | H04B 3/234 370/247 |
| 5,606,550 A * | 2/1997 | Jangi | ........................ | H04B 3/20 370/278 |
| 5,748,726 A * | 5/1998 | Unno | ........................ | H04B 3/23 379/406.05 |
| 6,516,050 B1 * | 2/2003 | Tasaki | ..................... | H04B 3/234 370/286 |
| 6,580,794 B1 * | 6/2003 | Ono | ....................... | H04M 9/082 379/406.01 |
| 9,818,426 B2 * | 11/2017 | Kotera | ................ | G10L 21/0232 |
| 2004/0018860 A1 * | 1/2004 | Hoshuyama | .......... | H04M 9/082 455/569.1 |
| 2004/0228454 A1 * | 11/2004 | Chen | ........................ | H04B 3/23 379/3 |
| 2005/0063536 A1 * | 3/2005 | Myllyla | ................. | H04M 9/082 379/406.08 |
| 2005/0129225 A1 * | 6/2005 | Piket | ...................... | H04M 9/082 379/406.01 |
| 2005/0286714 A1 * | 12/2005 | Tokuda | .................... | H04B 3/23 379/406.05 |
| 2008/0075270 A1 * | 3/2008 | Kamiya | ................ | H04M 9/082 379/406.08 |

(Continued)

*Primary Examiner* — Gerald Gauthier
(74) *Attorney, Agent, or Firm* — IP Spring

(57) ABSTRACT

Methods and systems detect residual echo in an audio signal in a non-causal manner. A non-causal residual echo detector allows accurate detection of any residual echo from an AEC (acoustic echo canceller). The non-causally detected residual echo may be utilized to perform various actions such as selecting between different causal AECs, tuning a causal AEC, and/or characterizing the performance of the causal AEC. Aspects leverage an understanding that the information about residual echo being present in a signal does not have to be causal in the sense that it is acceptable and even advantageous to know some time afterwards (e.g., after a signal has undergone acoustic echo cancellation and is output for further processing or transmission) that a residual echo was present in the signal. Such an approach is different from the case of an AEC, which needs to know right away, with a fairly low signal delay involved, whether residual echo is present.

18 Claims, 10 Drawing Sheets

(56) References Cited

U.S. PATENT DOCUMENTS

| | | | | |
|---|---|---|---|---|
| 2009/0245527 A1* | 10/2009 | Kumar | .................... | H04B 3/234 |
| | | | | 381/66 |
| 2009/0257579 A1* | 10/2009 | Takada | .................... | H04B 3/23 |
| | | | | 379/406.08 |
| 2011/0019831 A1* | 1/2011 | Liu | ....................... | H04M 9/082 |
| | | | | 381/66 |
| 2013/0129078 A1* | 5/2013 | Fadili | ....................... | H04B 3/23 |
| | | | | 379/406.08 |
| 2013/0251169 A1* | 9/2013 | Awano | .................... | H04R 3/02 |
| | | | | 381/66 |
| 2013/0287216 A1* | 10/2013 | Eriksson | ................. | G10L 21/02 |
| | | | | 381/59 |
| 2014/0357322 A1* | 12/2014 | Beaucoup | ............. | H04M 9/082 |
| | | | | 455/570 |
| 2015/0126255 A1* | 5/2015 | Yang | ................... | G10L 21/0208 |
| | | | | 455/570 |
| 2015/0156598 A1* | 6/2015 | Sun | ..................... | H04L 12/1822 |
| | | | | 348/14.07 |
| 2015/0332704 A1* | 11/2015 | Sun | ....................... | H04M 9/082 |
| | | | | 704/227 |
| 2015/0350777 A1* | 12/2015 | Yang | ........................ | H04M 9/08 |
| | | | | 381/66 |
| 2017/0171380 A1* | 6/2017 | Singh | .................... | H04M 3/002 |

\* cited by examiner

RESIDUAL ECHO DETECTION BASED ON NON-CAUSALITY

BACKGROUND

Acoustic echo is echo that may originate from the use of hands-free communication equipment with external loudspeakers and microphones. For example, acoustic echo may occur in a communication session between two participants when audio signals played out from a loudspeaker at one end of the transmission path are picked-up (or captured) by a microphone located at that same end of the transmission path and sent back to the originating participant at the other end of the transmission path. The originating participant will then hear the echo of the participant's own voice as he or she is speaking.

Acoustic echo can also be intensified in a number of scenarios. For example, acoustic echo may be intensified if sensitive microphones are used, the microphone and/or loudspeaker volume is turned up to a high level, or the microphone and loudspeaker are positioned in close proximity to one another. Acoustic echo can also be further aggravated by various acoustic effects (e.g., reverberation effects, wave reflections, etc.) produced by the user's environment.

Acoustic echo cancellation is an audio processing technique essential to providing speech enhancement (or voice quality enhancement) in many audio communication applications, including, for example, VoIP networks and telephony systems. An acoustic echo canceller (AEC), which is designed to remove echo from a signal captured at a microphone, allows audio communication sessions to progress more smoothly and naturally by preventing the annoyances and disruptions often caused by acoustic echo.

However, an AEC solution that is poorly designed, not operating effectively, or inappropriate for the particular location will not provide such benefits and can even degrade audio quality significantly. As such, there remains a technical problem in existing AECs that may not eliminate acoustic echoes such that some amount of residual echo remains.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for signal processing. More specifically, aspects of the present disclosure relate to detecting residual echo in an audio signal in a non-causal manner. Other aspects relate to utilizing the non-causally detected residual echo to perform various actions such as selecting between different causal AECs, tuning a causal AEC, and/or characterizing the performance of the causal AEC.

Aspects include a computer-implemented method of detecting a residual echo from an acoustic echo canceller (AEC) receiving near-end audio samples output from the AEC and far-end audio samples, including: collecting received frames of the far-end audio samples and the near-end audio samples from the AEC; aggregating the received frames of the far-end and near-end audio samples with previously collected frames of the far-end and near-end audio samples; generating an estimated value indicating a likelihood of residual echo presence in the AEC output audio samples output from the acoustic echo canceller using a non-causal echo detector in which the estimated value is generated after a residual echo was present in the near-end samples from the AEC; and performing an action based on the estimated value indicating likelihood of residual echo presence.

Aspects also include the collecting step collecting received frames of the far-end audio samples and the near-end audio samples over a time window exceeding 70 ms. Related aspects include the collecting step collecting received frames of the far-end audio samples and the near-end audio samples over a time window exceeding 100 ms. Other related aspects include the time window being from 500 ms to 60 seconds.

Further aspects include the aggregating step respectively aggregating the received frames of the far-end and near-end audio samples with previously collected frames of the far-end and near-end audio samples into a representative value for each of the respective frames of the far-end and near-end samples, wherein the generating step cross-correlates the representative values of the respective frames.

Even further aspects include wherein the cross-correlation is between a) the far-end audio samples and residual audio samples; b) down-sampled variants of the far-end audio samples and residual audio samples; c) average signal powers of the far-end audio samples and residual audio samples; d) down-sampled powers of the far-end audio samples and residual audio samples; e) activity indicators for the far-end audio samples and residual audio samples; or f) high-pass filtered far-end audio samples and residual audio samples.

Yet further aspects are the generating step including: converting the aggregated frames of the far-end and near-end audio samples to a frequency domain having frequency sub-bands; weighting at least one of the frequency sub-bands of the aggregated near-end audio samples with a weighting value; and cross-correlating the weighted frequency sub-bands of the aggregated near-end audio samples with frequency sub-bands of the far-end audio samples.

Still further aspects include performing an action based on the estimated value indicating likelihood of residual echo presence including: comparing the estimated value indicating likelihood of residual echo presence with a threshold; and performing an action in response to the estimated value indicating likelihood of residual echo presence satisfying the threshold.

Still yet further aspects include wherein the action performed in response to the estimated value indicating likelihood of residual echo presence satisfying the threshold includes tuning the acoustic echo canceller.

Even further aspects are the acoustic echo canceller including at least a first and a second acoustic echo canceller, wherein the action performed in response to the estimated value indicating likelihood of residual echo presence satisfying the threshold includes switching from the first to the second acoustic echo canceller.

Still further aspects are wherein the action performed in response to the estimated value indicating likelihood of residual echo presence satisfying the threshold includes logging at least the estimated values indicating a likelihood of residual echo presence in the residual audio samples output from the acoustic echo canceller.

Even further aspects are wherein the logging also includes reporting at least the estimated values indicating a likelihood of residual echo presence in an the residual audio samples output from the acoustic echo canceller.

Still even further aspects are wherein the action does not include suppressing the residual echo.

Even yet further aspects include continuing said collecting, aggregating, generating, comparing and performing steps on a continuous, periodic or a-periodic basis.

Aspects of the invention also relate to apparatus embodiments such as an apparatus for detecting a residual echo from an acoustic echo canceller (AEC) receiving near-end audio samples output from the AEC and far-end audio samples, comprising: one or more processors; and a non-transitory computer-readable medium coupled to said one or more processors having instructions stored thereon that, when executed by said one or more processors, cause said one or more processors to perform operations comprising: collecting received frames of the far-end audio samples and the near-end audio samples from the AEC; aggregating the received frames of the far-end and near-end audio samples with previously collected frames of the far-end and near-end audio samples; generating an estimated value indicating a likelihood of residual echo presence in the AEC output audio samples output from the acoustic echo canceller using a non-causal echo detector in which the estimated value is generated after a residual echo was present in the near-end samples from the AEC; and performing an action based on the estimated value indicating likelihood of residual echo presence.

Other aspects of the apparatus include collecting received frames of the far-end audio samples and the near-end audio samples over a time window exceeding 70 ms. Even further aspects of the apparatus include collecting received frames of the far-end audio samples and the near-end audio samples over a time window exceeding 100 ms. Moreover, the time window may be from 500 ms to 60 seconds.

Yet further aspects of the apparatus include respectively aggregating the received frames of the far-end and near-end audio samples with previously collected frames of the far-end and near-end audio samples into a representative value for each of the respective frames of the far-end and near-end samples, the generating step cross-correlating the representative values of the respective frames.

Even further aspects of the apparatus include wherein the cross-correlation is between a) the far-end audio samples and residual audio samples; b) down-sampled variants of the far-end audio samples and residual audio samples; c) average signal powers of the far-end audio samples and residual audio samples; d) down-sampled powers of the far-end audio samples and residual audio samples; e) activity indicators for the far-end audio samples and residual audio samples; or f) high-pass filtered far-end audio samples and residual audio samples.

Still further aspects of the apparatus include, for the generating step, converting the aggregated frames of the far-end and near-end audio samples to a frequency domain having frequency sub-bands; weighting at least one of the frequency sub-bands of the aggregated near-end audio samples with a weighting value; and cross-correlating the weighted frequency sub-bands of the aggregated near-end audio samples with frequency sub-bands of the far-end audio samples.

Still further aspects of the apparatus are performing an action based on the estimated value indicating likelihood of residual echo presence including: comparing the estimated value indicating likelihood of residual echo presence with a threshold; and performing an action in response to the estimated value indicating likelihood of residual echo presence satisfying the threshold.

Still yet further aspects of the apparatus are wherein the action performed in response to the estimated value indicating likelihood of residual echo presence satisfying the threshold includes tuning the acoustic echo canceller.

Even further aspects of the apparatus are the acoustic echo canceller including at least a first and a second acoustic echo canceller, wherein the action performed in response to the estimated value indicating likelihood of residual echo presence satisfying the threshold includes switching from the first to the second acoustic echo canceller.

Still even further aspects of the apparatus are wherein the action performed in response to the estimated value indicating likelihood of residual echo presence satisfying the threshold includes logging at least the estimated values indicating a likelihood of residual echo presence in the residual audio samples output from the acoustic echo canceller.

Other aspects of the apparatus relate to wherein the logging also includes reporting at least the estimated values indicating a likelihood of residual echo presence in the residual audio samples output from the acoustic echo canceller.

Still other aspects of the apparatus are wherein the action does not include suppressing the residual echo.

Yet further aspects of the apparatus are wherein the one or more processors are caused to perform further operations comprising: continuing said collecting, aggregating, generating, comparing and performing steps on a continuous, periodic or a-periodic basis.

It should be noted that embodiments of some or all of the processor and memory systems disclosed herein may also be configured to perform some or all of the method embodiments disclosed above. In addition, embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
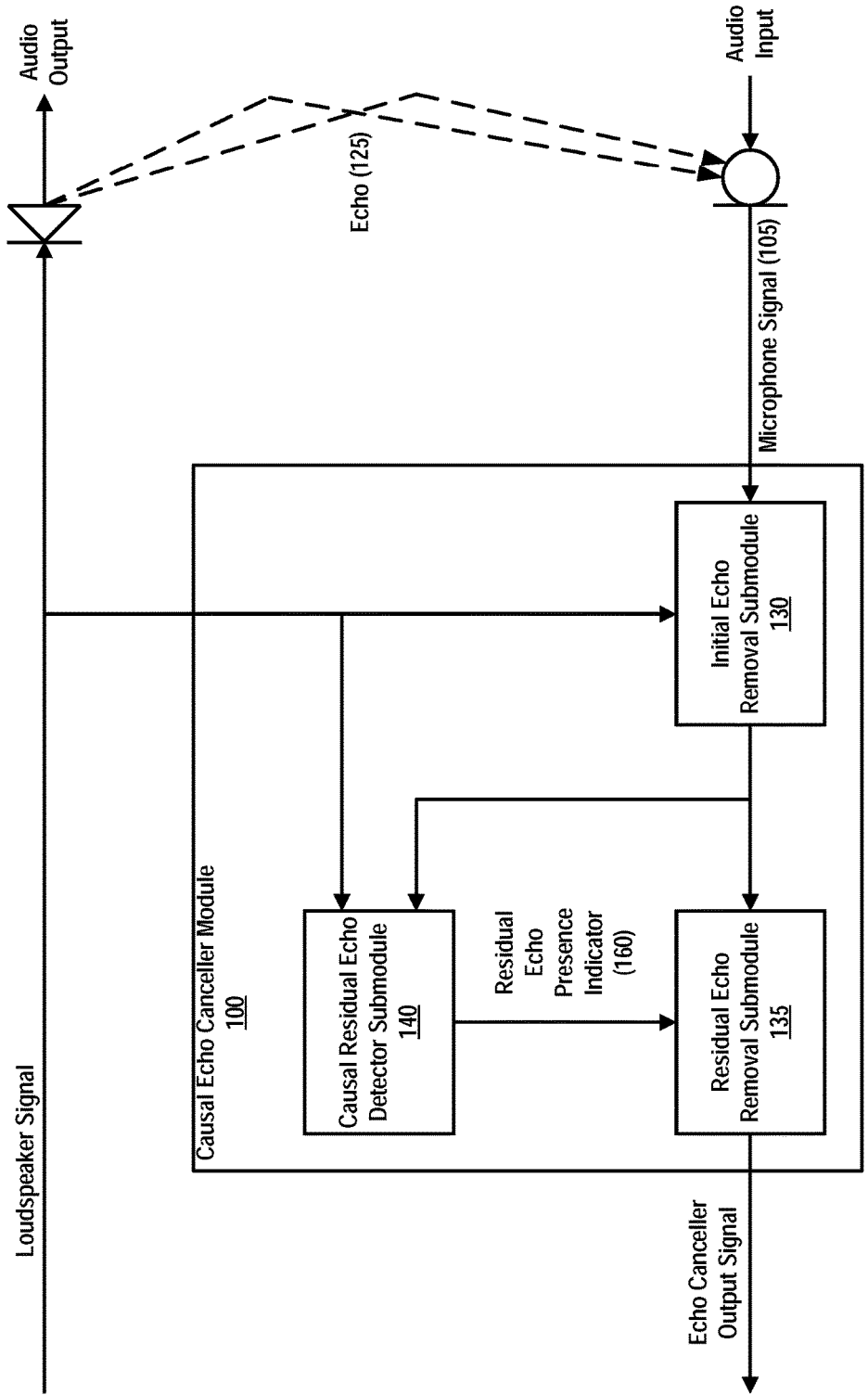
FIG. 1 is a block diagram illustrating an example echo canceller module including submodules for residual echo detection and removal.

The headings provided herein are for convenience only and do not necessarily affect the scope or meaning of what is claimed in the present disclosure.

For ease of understanding and convenience, use of the same reference numerals and any acronyms in different drawings or description sections identify elements or acts with the same or similar structure or functionality The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

As mentioned above, an AEC typically removes echoes present in a microphone signal in an audio communications setup (e.g., VoIP network, telephony system, etc.). For example, a conventional causal AEC is typically designed to quickly and accurately remove any echoes to such a level that no echoes are present in the output (or at least no echoes audible to a user).

In order to determine whether a given AEC system (e.g., arrangement, implementation, solution, etc.) is working correctly, or to verify whether a particular audio communication setup has acoustic properties that produce echoes, it is desired to be able to detect the presence of residual echoes (e.g., in the output of the AEC). However, the problem is that an attempt at such detection has already been made in the AEC (if such an AEC is available), which means that for the given setup the problem of removing the residual echoes is likely intractable for the AEC (which would have removed the residual echoes if they had been detected). For at least this reason, conventional causal AEC solutions are not suitable for addressing this problem.

Embodiments of the present disclosure relate to methods, systems, and apparatus for non-causal residual echo detection that enables new functionality to enhance the user experience.

For example, most cellular telephones and other mobile user devices utilize a hardware AEC, which is typically optimized for the properties of the particular device. Such AEC solutions are causal in the sense that they need to remove the echo in real-time with a minimal delay. In a scenario where this hardware AEC is sub-optimal, malfunctioning or is disabled, a non-causal residual echo detector in accordance with the embodiments described herein allows accurate detection of any resultant residual echo. Some aspects disclosed herein leverage such non-causal echo detection so that an alternative solution may be enabled, such as, for example, software causal AEC that is installed in or running on the device. The definition of "non-causal" echo detection will be further explained below.

As will be described in greater detail herein, the non-causal residual echo detector of the present disclosure may be designed to produce (e.g., generate, measure, calculate, collect, etc.) a variety of data (e.g., statistical data) associated with the performance of one or more causal AECs. For example, the non-causal residual echo detector may generate various types of data based on the detected presence of residual echoes in an output signal of a causal AEC. Such data may include, for example, frequency of residual echo presence in the output of the AEC, intensity (e.g., volume) of detected residual echoes, and the like. The data that may be produced by the non-causal residual echo detector of the present disclosure may sometimes herein be referred to as "non-causal residual echo detection data."

The data and information that may be collected or produced by the non-causal residual echo detector may be used in numerous ways to enhance the overall user experience. For example, the residual echo detection data may be used to assess whether a given audio communication setup or system is appropriate for the intended application (e.g., video conferencing, high-quality audio conferencing, etc.), whether one or more causal AECs being used in the communication setup is non-optimal, malfunctioning or failing, whether one or more settings of a particular causal AEC needs to be adjusted or tuned, and so on.

The methods, systems, and apparatus of the present disclosure are designed based on the understanding that the information about residual echo being present in a signal does not have to be causal in the sense that it is perfectly fine to know some time afterwards (e.g., after a signal has undergone acoustic echo cancellation and is output for further processing or transmission) that a residual echo was present in the signal. Such an approach is different from the case of a AEC, which needs to know right away, with a fairly low signal delay involved, whether residual echo is present. As an example, for an AEC to be able to remove all of the echoes in a signal at time 1, the AEC needs to know, at time t, about the presence of any echoes in the signal at time t, as the AEC will need to produce the AEC output at time t. As such, an AEC that effectively removes echoes is necessarily causal.

In contrast, the methods, systems, and apparatus of the present disclosure drop this causality restriction/requirement of conventional AECs, and instead allow for a non-causal residual echo detector to, at a later time t+D, report that residual echoes were present in the signal at time t. In other words, by removing the causality restriction/requirement of conventional AECs for the task of detecting residual echoes, the present disclosure provides a non-causal residual echo detector that is capable of accomplishing significantly more in terms of detecting residual echoes than the causal residual echo detector present in existing AEC solutions.

In general, the difference between the non-causal echo detection and causal echo detection is that the non-causal variant does not have any time-constraint in the sense that there is deadline for when the detection decision/result needs to be made. The causal variant is, on the other hand, restricted to produce a detection decision within the algorithmic delay of the echo canceller functionality. To complicate things, there is no absolute limit for how long of an algorithmic delay an echo canceller may have. A limitation for the algorithmic delay is that for a VoIP setup to produce a good conversational quality the audio processing components should not have too long delay as that otherwise will impact the quality of the call. That in turn means that a causal AEC cannot have too long algorithmic delay, which in turn means that it cannot wait too long for echo detection. In other words, a causal AEC needs to have a low algorithmic/signal delay and therefore cannot wait too long to detect any residual echoes. The causality in that case would mean that the causal AEC needs to have a detection decision/result at the time of the echo removal.

The non-causal echo detector embodiments disclosed herein do not, in contrast, have any constraints that their echo detection decision needs to be in place at the time that the AEC in the system removes the echo. The non-causality comes from the fact that it can determine the presence of echoes in the past. A typical value for the acceptable delay of a causal AEC would be not more than 70 ms.

It should be noted that any of a variety of causal echo detection techniques known in the art may be adapted to a non-causal detection of residual echo in the output of the AEC in the methods and systems of the present disclosure.

In accordance with one or more embodiments described herein, such conventional AEC techniques may be adapted to a non-causal echo detection environment by operating over a much wider time window in a residual echo detector. For a causal AEC this window is approximately less than 70 ms and in the neighborhood of 10 ms in order to perform well. In contrast, for the non-causal echo detector 250 this time window could range from greater than 70 ms to, preferably, greater than 100 ms with an even more preferable sub-range being between 500 ms and 60 seconds. The wider time window essentially eliminates the causality constraint that is imposed in existing AEC solutions, which are required to be causal.

To further adapt conventional causal AEC techniques to a non-causal echo detection environment of the non-causal echo detector 250, the echo removal components (e.g. residual echo removal submodule 135 and initial echo removal submodule 130 of AEC 100) would be eliminated because a goal of non-causal echo detection is not to remove or suppress the echo but to detect the residual echo from an AEC so that some other action (other than echo suppression) may be performed.

For example, the non-causal residual echo detection by module 250 may be performed by adapting conventional cross-correlation techniques as further described herein.

Performing residual echo detection in a non-causal manner allows the residual echo detector of the present disclosure to accomplish the detection in different, more effective ways as compared to the techniques used in conventional AECs. It should be noted that the methods, systems, and apparatus for non-causal residual echo detection of the present disclosure are adaptable for a wide variety of uses and applications including, for example, assessing and/or characterizing AEC performance, selecting or switching between different AEC solutions, tuning an AEC for improved performance, and the like.

An example of a conventional causal AEC is shown in FIG. 1. A causal AEC module 100 is typically designed to remove loudspeaker echoes (125) from a signal (105) captured at a microphone in an audio communication setup. The causal AEC module 100 may include several submodules. For ease of explanation, example causal AEC module 100 is separated into two echo removal submodules, namely, Initial Echo Removal Submodule 130 and Residual Echo Removal Submodule 135. Residual Echo Removal Submodule 135 is tasked with removing all residual echoes remaining in the output from the Initial Echo Removal Submodule 130. The echo removal functionality in the Residual Echo Removal Submodule 135 is controlled by a Residual Echo Detector Submodule 140, which operates to detect any residual echoes in the output of the Initial Echo Removal Submodule 130, and provides an indication or assessment (160) of residual echo presence to the Residual Echo Removal Submodule 135.

It should be noted that an important design requirement for any causal (conventional) AEC is that the delay of the causal AEC be very low, since any delay introduced will increase the communication delay which, in turn, will reduce the end-user experience (as an increase in delay is directly proportional to a decrease in end-user experience). As such, the conventional Residual Echo Detector Submodule 140 should provide an (almost) instantaneous assessment of whether residual echoes are present in the output of the Initial Echo Removal Submodule 130 (as the Residual Echo Removal Submodule 135 cannot wait for any such assessment without introducing a delay). As described above, this restriction or requirement can be considered to be causal in the sense that the residual echo presence assessment (160) must not arrive after the residual echo was present in the signal (and due to the requirement on low signal delay it is not possible for the Residual Echo Removal Submodule 135 to delay the signal until the assessment (160) arrives).

Figure 2:
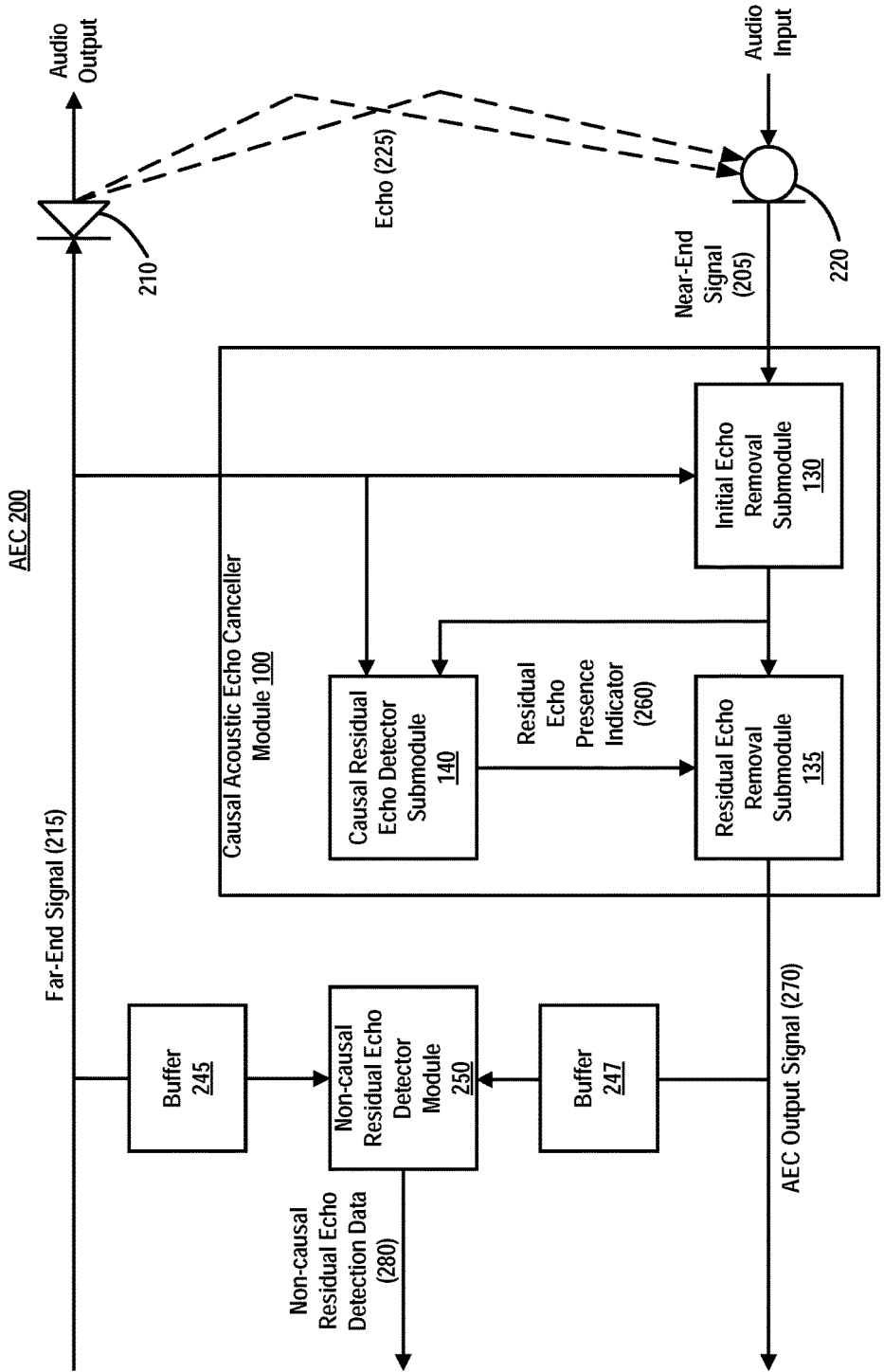
FIG. 2 is a block diagram illustrating an example system for non-causal residual echo detection according to one or more embodiments described herein.

FIG. 2 is an example arrangement of a non-causal residual echo detector 250 in accordance with one or more embodiments described herein. In contrast to the causal residual echo detection approach of conventional AEC solutions, such as that shown in FIG. 1 and described in detail above, the methods, systems, and apparatus of the present disclosure are designed to perform residual echo detection in a non-causal manner, without the limitations and restrictions imposed by the causality requirement.

It should be noted that, in accordance with at least one embodiment, the non-causal residual echo detector 250 described herein is not intended to provide residual echo presence assessment in order to remove residual echoes from the microphone signal, but rather to provide residual echo presence assessment for more long-term purposes such as, for example, reporting of AEC performance statistics, tuning one or more parameters of the AEC, switching between multiple AECs of the same or different type, etc.

In the example arrangement shown in FIG. 2, the non-causal Residual Echo Detector Module 250 may be placed (e.g., positioned, arranged, etc.) after or outside of the AEC 100 for the purpose of detecting residual echoes in the AEC output signal (270). This location/placement of the Residual Echo Detector Module 250 allows for the approach in the invention to provide residual echo presence assessment in a non-causal manner as it is not used for residual echo removal purposes.

In accordance with one or more embodiments, the AEC 200 may be designed as a high-quality echo canceller for voice and/or audio communications over a network (e.g., packet switched network). More specifically, the AEC 200 may be designed to cancel acoustic echo (225) that emerges due to the reflection of sound waves output by an audio rendering device 210 (e.g., a loudspeaker) from boundary surfaces and other objects back to a near-end audio capture device 220 (e.g., a microphone). The echo (225) may also exist due to the direct path from the render device 210 to the capture device 220.

Audio rendering device 210 may be any of a variety of audio output devices, including, for example, a loudspeaker or group of loudspeakers configured to output sound from one or more channels. Audio capture device 220 may be any of a variety of audio input devices, such as one or more microphones configured to capture sound and generate input signals. For example, render device 210 and capture device 220 may be hardware devices internal to a computer system, or external peripheral devices connected to a computer system via wired and/or wireless connections. In some arrangements, render device 210 and capture device 220 may be components of a single device, such as a microphone, telephone handset, etc. Additionally, one or both of render device 210 and capture device 220 may include analog-to-digital and/or digital-to-analog transformation functionalities.

Although not shown in FIG. 2, in at least one embodiment of the present disclosure, the causal AEC module 100 may include a linear filter (which may be an adaptive filter), a nonlinear processor (NLP). It is to be understood that the causal AEC module 100 is a conventional element in and of itself and may be constructed in any manner known in the art. For the purposes of illustration only, the causal AEC module 100 being described herein may include a linear filter and a non-linear processor. A far-end signal (215) generated at the far-end of the signal transmission path and transmitted to the near-end may be input to the linear filter via one or more of the buffers (not shown), which may be configured to feed blocks of audio data to the filter and the NLP. The far-end signal (215) may also be input to a play-out buffer (not shown) located in close proximity to the render device 210. The far-end signal (215) may be input to the play-out buffer (not shown) and the output signal of the play-out buffer may be input to the linear filter and to the NLP.

The linear filter, which may be an adaptive filter, may operate in the frequency domain through, e.g., the Discrete Fourier Transform (DFT). The DFT may be implemented as a Fast Fourier Transform (FFT). As will be further described below, in one or more embodiments the AEC may include one filter for each render device and capture device combination (e.g., for each loudspeaker-microphone combination). Additionally, in one or more embodiments described herein, in the adaptive filter (e.g., Normalized Least Means Square (NLMS) algorithm) of the AEC, the normalization may be performed over all far-end channels (e.g., an averaged power). It should be noted that while the linear filter may be an adaptive filter, it is also possible for the filter to be a static filter without in any way departing from the scope of the present disclosure.

Another input to the linear filter may be the near-end signal (205) from the audio capture device 220 (e.g., input to the linear filter via, for example, a recording buffer). The capture device 220 may receive audio input, which may include, for example, speech, and also the echo (225) from the audio output of the render device 210. The capture device 220 may send the audio input and echo (225) as near-end signal 205 to the recording buffer. In accordance with at least one embodiment, the NLP of the AEC 200 may receive three signals as input: (1) the far-end signal (215) via, for example, a play-out buffer, (2) the near-end signal (205) via, for example, a recording buffer, and (3) the output signal of the linear filter. The output signal from the linear filter may also be referred to as an error signal. In a case where the NLP attenuates the output signal of the linear filter, a comfort noise signal may be generated. Comfort noise may also be generated in the AEC 200. For example, in accordance with at least one embodiment, one comfort noise signal may be generated for each channel, or the same comfort noise signal may be generated for all channels.

The non-causal echo detector module 250 receives the AEC output signal 270 via buffer 247 and the far end signal 215 via buffer 245. The buffers 245, 247 may be constructed with a conventional memory device having storage space sufficient to buffer the AEC output signal 270 and far-end signal 215 for a period of time (e.g. 100 ms to 60 seconds or even longer with a preferable subrange of 500 ms to 60 sec) that corresponds to non-causal echo detection. The buffers 245, 247 may be constructed with the same memory device or a separate memory device. Furthermore, the buffers 245, 247 may be physically located within the non-causal residual echo detector module 250. Depending upon the processing speed of module 250 the buffers 245, 247 may be optional or even completely eliminated and their illustration in the figures may alternately be interpreted as arriving blocks of audio data the size of which may be determined by conventional factors as is known in the art.

Figure 6A:
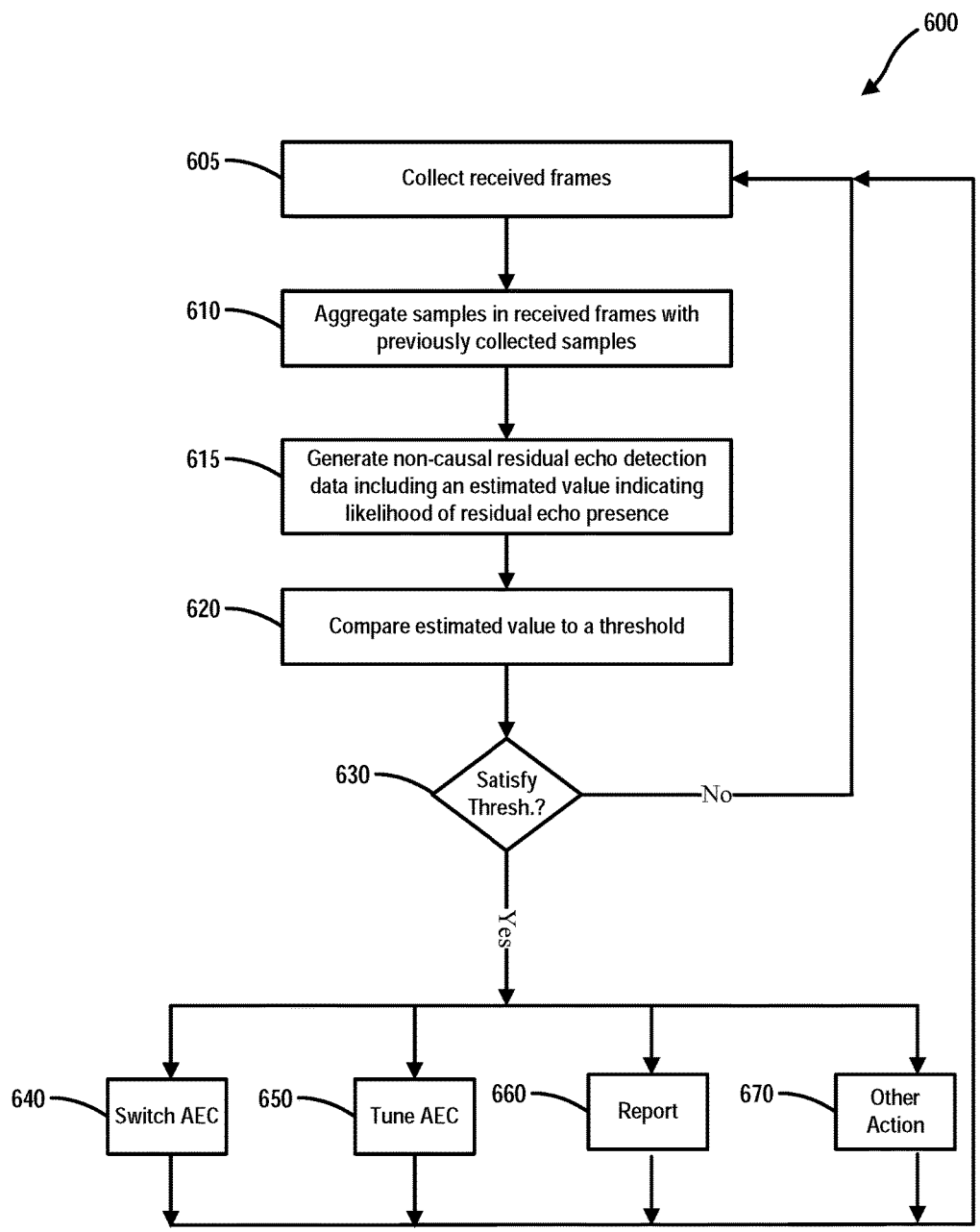
FIG. 6A is a flowchart illustrating an example method for non-causal residual echo detection according to one or more embodiments described herein.

FIG. 6A is a high-level flowchart illustrating an embodiment for detecting residual echo and acting upon the detected residual echo. The process illustrated in FIG. 6A may be performed by the non-causal echo detector module 250. The process starts (600) with collecting (605) the most recently received frame (block of audio samples) of the signals 215 and 270 (e.g. from buffers 245, 247).

Next, the process aggregates (610) the samples in the frame with previously collected samples (samples that were collected in the past from 215 and 270). More specifically, the aggregation of the data (step 610) in the received frames may be (assuming N frames of 10 ms data is collected both from 215 and 270) performed as follows:

1) Form aggregated data windows by respectively aggregating M*N frames of data collected from 215 and 270 from the internal vectors X (representing the far-end signal 215 frames of audio data) and Y (representing the residual echo signal 270 output from the AEC 100) to form aggregated data windows suitable for non-causal echo detection. For example, the aggregated data windows for 215 and 270 may be greater than 100 ms (e.g. M<=10), or more broadly in a range from 100 ms to 60 seconds with preferable subrange of 500 ms to 60 sec.

2) As new data frames arrive, append the newly received data from 215 to vector X and the data from 270 to the vector Y while discarding the oldest frames so as to maintain the aggregated data window size for X and Y.

In some embodiments, the aggregated frames may be down-sampled and/or high-pass filtered. Down-sampling focusses the detection process on the lower frequencies for at least some of the detection techniques disclosed herein such as sample based cross correlation in the time domain. Down-sampling is a conventional process in and of itself and may produce better results, reduce computational complexity and thereby speed processing time. High-pass filtering is also a conventional process in and of itself.

In an alternative embodiment, aggregation (610) may also further include calculating a single measurement value per frame that represents all of the samples in each of the respective frames. In addition to the exemplary frame size of 10 ms another alternative is to perform this calculation of a single measurement value per sub-frame with a window size of, for example, 5 ms, which would result in calculating the measurement value twice per frame (assuming 10 ms frame size). An advantage of using sub-frames is a better resolution as the cost of higher computational complexity.

There are a variety of such measurement values including average power (of raw or down sampled audio samples in the aggregated frame), activity indicators for each of the aggregated vectors X and Y (where "activity" is detected when the signal power for that aggregated frame exceeds a noise-floor based threshold value). Average power calculations are well known in and of themselves so a more detailed explanation thereof is being omitted for brevity.

This generation (615) of non-causal residual echo detection data may be performed in various different ways including adapting causal AEC methods to non-causal echo detection by using a wider time window (of aggregated frames) and eliminating the echo removal components. A non-limiting example is a windowed cross-correlation method. More specifically, the generation (615) may be performed by a cross correlation calculation between frames of the far end signal 215 with frames of the residual echo (AEC output 270) over a time window of aggregated frames.

As a further example, such windowed cross correlation may be computed recursively with an exponential forgetting factor. Such an approach would not require storing vectors (e.g. in a memory device (not shown in FIG. 2 but illustrated in FIG. 7)) of all past data from 215 and 270 and would be less complex.

The generation (615) of non-causal residual echo detection data may also be performed by computing the maximum of the normalized cross-correlation between the aggregated frames X and Y. This normalized cross-correlation estimate may be bounded between zero and one. The non-causal residual echo detection must be based both on data from the far end signal 215 and the AEC output 270. It is, however, definitely possible to aggregate the data of these separately. For instance in the above example, the data aggregation would be to update X and Y separately.

As mentioned above, the process generates (615) non-causal residual echo detection data based on the combined/aggregated data from step 610. The residual echo detection data corresponds to an estimated value for the likelihood of residual echo being present. Another example of how this generation (615) may be implemented is described below in relation to FIG. 8.

Figure 8:
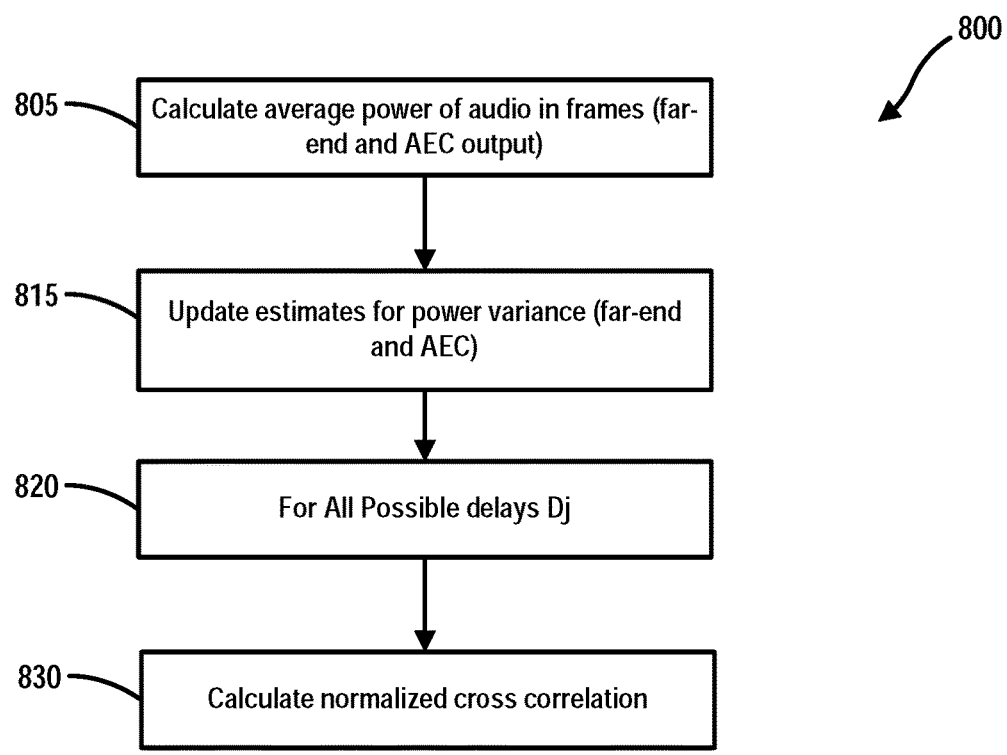
FIG. 8 is a flowchart illustrating an example method for generating non-causal residual echo detection data including an estimated value indicating a likelihood of residual echo presence according to one or more embodiments described herein.

FIG. 8 is a high level flow chart further illustrating an embodiment of the step 615 which generate non-causal residual echo detecting data. Process 800 illustrated in FIG. 8 may be implemented by non-causal residual echo detector module 250. This process 800 includes calculating (805) the average power of the audio contained within buffers 245, 247 respectively storing a frame of the far-end signal 215 and a frame of the AEC output signal 270. The average power calculation (805) may be performed as part of steps 610 or 615. The average power may be calculated by summing all squaring all samples in the frame divided by the time of one frame (e.g typically 10 ms but it is to be understood that a different frame size may be used). Since the time of a single frame is constant, the division can be omitted without altering the result. It is noted that the average power is separately calculated for the far-end signal 215 and the AEC output signal 270.

The process also updates (815) estimates for power variance for both the far-end signal 215 and the AEC output signal 270. Power variance can be calculated for each of the far side signal 215 frames and AEC output signal 270 frames by subtracting the mean from the samples, squaring the result and averaging those values. Instead of redoing this calculation from scratch, it can be iteratively estimated using the estimate from the previous frame, for example with the following formula: variance(x, t)=(1−a)*variance(x, t−1)+ a*(x−mean(x, t))^2. Here, a is a small value that controls how fast the estimate is allowed to change in each iteration. The value for mean(x,t) can be calculated in a similar way: mean(x,t)=(1−a)*mean(x, t−1)+a*x. Doing the calculations this way is significantly more efficient.

Next, for all possible delays (820) Dj, between the signals the process calculates (830) a normalized cross correlation Pcc which is a value indicative of the likelihood of residual echo presence. The range of possible delays spans the pan the maximum realizable delay between the loudspeaker signal and the output of the AEC (245 and 247). The loudspeaker signal will always be seen first, and a potential residual echo in the AEC output will be seen later, after the loudspeaker echo has been picked up by the microphone and the resulting microphone signal has been processed by the AEC. In practice, this delay range is from 20 ms to 1000 ms. This calculation may be done in an iterative fashion by applying the following equation:

$$Pcc = E[(x-E[x])(y-E[y])]^2 / (E[(x-E[x])(x-E[x])](E[(y-E[y])(y-E[y])])$$

where E[ ] denotes the expectation value operator.

That formula can be recursively updated, but it should be done in such a way that the numerator and the two terms in the denominator are recursively updated separately.

Figure 9:
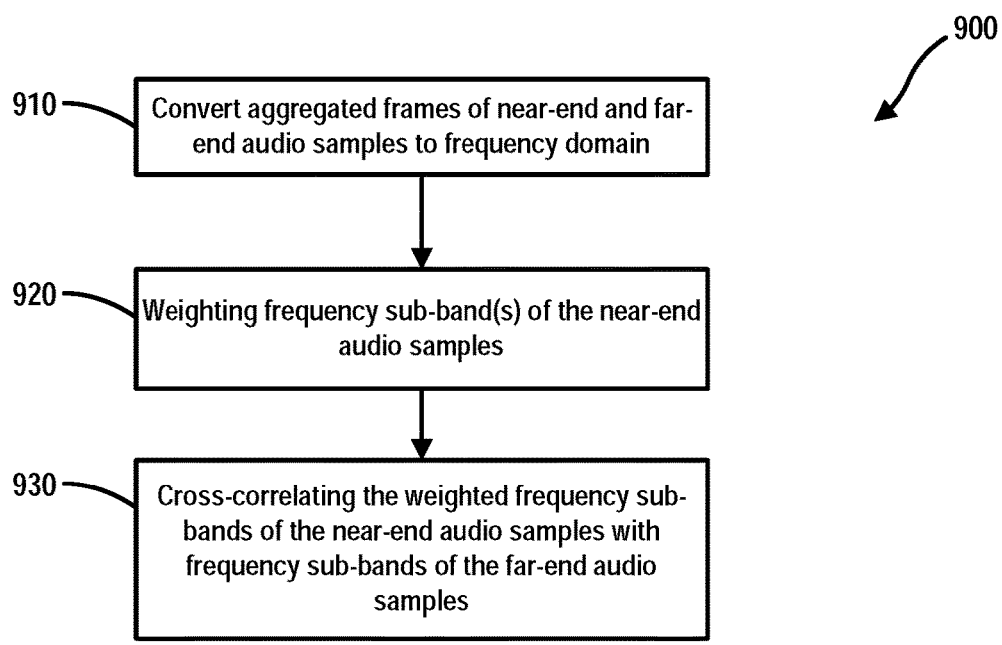
FIG. 9 is a flowchart illustrating another example method for generating non-causal residual echo detection data including an estimated value indicating a likelihood of residual echo presence according to one or more embodiments described herein.

Another example, the generation (615) of non-causal residual echo detection data may be performed by cross correlating the aggregated frames of near-end and far-end audio samples in the frequency domain using weighted sub-bands. FIG. 9 illustrates this alternative process (900) which includes converting (910) the aggregated frames of the near-end (270) and far-end audio samples (215) to a frequency domain representation using, for example, a conventional DFT (digital Fourier transform)-based transform or a filter bank. It is to be understood that other frequency transforms may be used, however. Weighting (920) may be applied to some (at least one) or all of the frequency sub-bands of the near-end signal (AEC output signal 270). Such weighting (920) would preferably be applied to frequency sub-band(s) in which the AEC 100 is known to leak echo, otherwise has poor performance, or where the frequency content of the signals involved is limited to a certain frequency region. In this way, any residual echo from the AEC 100 may be more easily detected. Due to the range of possible, conventional AECs 100 that may be used with the invention, the values of such frequency sub-bands and the weighting values may be empirically determined.

There are many ways in which the generation (615) of non-causal echo detection may be performed. Some non-limiting examples include 1) Cross-correlating the samples between X and Y (discussed above in detail); 2) Cross-correlating down-sampled variants of X and Y; 3) Cross-correlating the average powers of X and Y (mentioned above with the power calculation being either part of the aggregation (615) or the generation (615) steps; 4) Cross-correlating the downsampled powers of X and Y, 5) Cross-correlating activity indicators for X and Y where activity is detected when the signal power satisfies a noise-floor-based threshold, and 6) Cross-correlating the high-pass filtered signals x and y. Each of the alternatives 1)-6) mentioned above are within the scope of generating (615) non-causal echo detection data.

Next, the process may compare (630) the likelihood value to a threshold to determine whether residual echo should be deemed present or not. This comparison (630) operation may be performed on a single value of the residual echo detection data indicative of the likelihood of residual echo presence from the AEC 300 and corresponds to the value output by step 615. Alternatively, this comparison (630) may detect residual echo when the residual echo detection data (e.g. normalized cross correlation estimate) satisfies the threshold for a certain period of time.

If the comparison/detection (630) determines that the likelihood satisfies the threshold then one or more processes may be performed including selecting (640) a different causal AEC (explained further below in connection with FIG. 4), tuning the causal AEC (explained further below in connection with see FIG. 3), reporting (660) the residual echo detection data, or some other action (670) that leverages the non-causal detection of residual echo.

It is to be understood that "satisfies the threshold" is a relative term that encompasses the likelihood value being above or below the threshold or the likelihood value being equal to a specific number. Furthermore, the threshold should not necessarily be fixed but could be time-varying. Still further, the threshold may be two-sided so as to define a region such that if the likelihood value is in the region defined by the two-sided threshold then the threshold is satisfied; otherwise the threshold is not satisfied if outside the region.

The threshold value used in the comparison (630) differs depending upon which of these actions 640 (select AEC), 650 (Tune ARC), 660 (report), 670 (other action) is triggered and the value(s) thereof may be determined empirically. For example, for reporting (660), the threshold value used in 630 may be set to zero or a very low value (assuming "satisfy the threshold" means being above the threshold) in order to always log the estimated value used in 620. In other words, for the reporting function (660), the threshold may be of value that reports echoes even though it may be a certain risk of false detection, as that would regardless be of interest. In the case of reporting, the user experience will not be impacted by the behavior of the detector.

For tuning (650) the threshold may be set to a lower value than for switching (640) to a different causal AEC (again, assuming "satisfying the threshold" means being above the threshold). For switching (640) to another AEC and tuning (650), the detection (630) must instead be extremely certain and the threshold chosen carefully as a misdetection will cause a wrong choice to be made which may cause a negative user experience.

Moreover, the reporting (660) and/or other action (670) may be performed in parallel such that the report (660) is always generated and the other action (670) performed when appropriate.

If the comparison (630) determines that the likelihood does not satisfy the threshold then no further action need be taken and the process loops back to the start to collect (605) the next received frame.

The reporting (650) function may also be viewed as a logging function. The logging/reporting (650) may log a variety of data such as aggregating the calculated likelihood values over longer time periods. Such logs may include histograms or percentiles. Furthermore, the reporting (650) may send a report log to a server or other data gathering entity. It is to be understood that such reporting (650) to any entity should be under the control of a user such, as, for example, an opt-in or opt-out data privacy policy. Moreover, any such reporting data should preferably be anonymized to protect user privacy to users who opted in to uploading logs.

Figure 3:
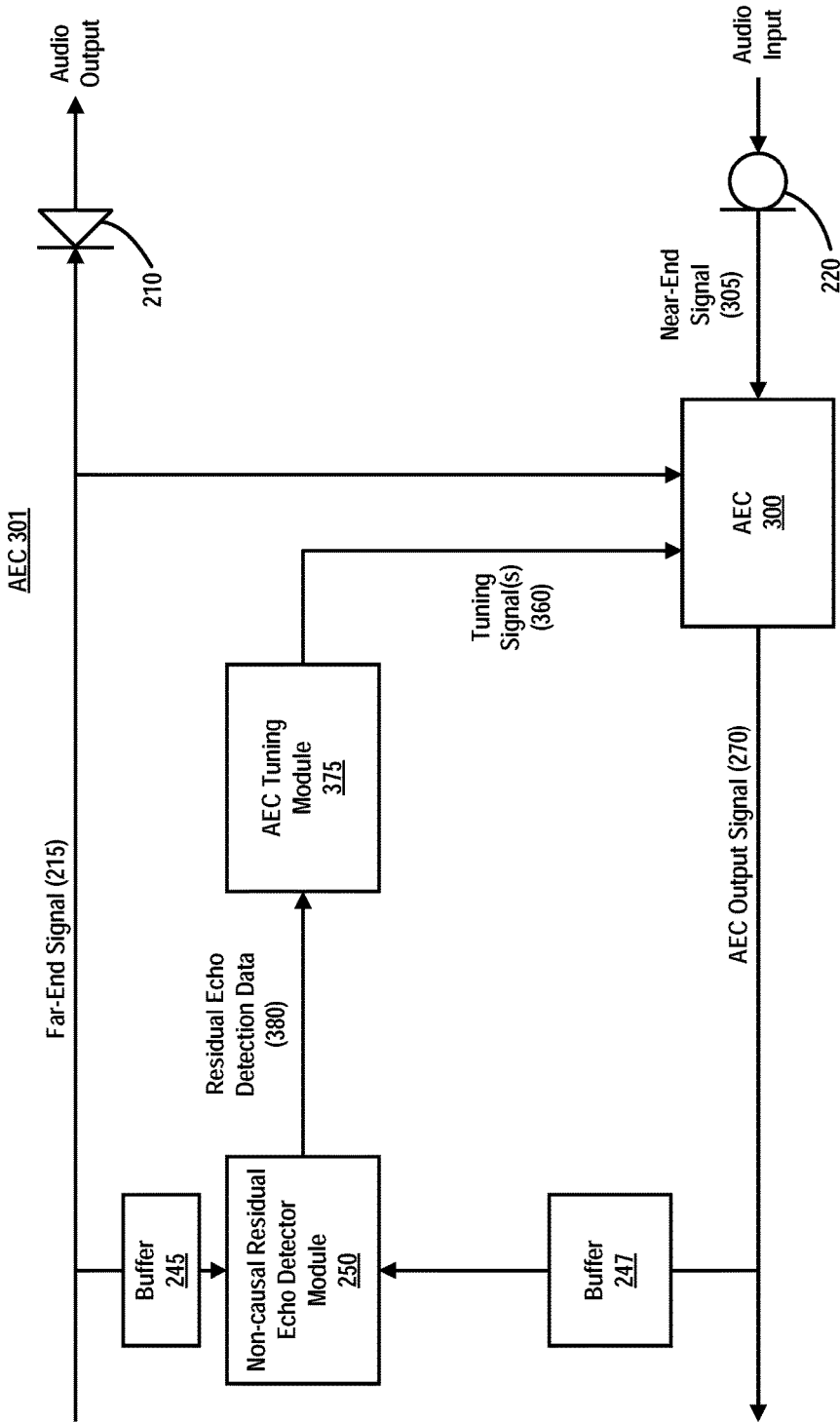
FIG. 3 is a block diagram illustrating an example system for acoustic echo cancellation using residual echo detection data to generate tuning signals for an echo canceller according to one or more embodiments described herein.

FIG. 3 shows an example system 301 for acoustic echo cancellation in which a non-causal residual echo detector module 250 provides residual echo detection/presence data that may be used to generate tuning signals for an acoustic echo canceller 300 in accordance with one or more embodiments described herein and further explains turning (650) AEC described above.

As further shown in FIG. 3, the residual echo detection data 380 is fed to an AEC tuning module 275. In response thereto, the AEC tuning module 375 sends tuning signal(s) to the AEC 300. In one embodiment, the non-causal residual echo detection module 250 implements the process of FIG. 6A such that if the estimated value satisfies the threshold (620, 630) then tuning AEC (650) process is carried out. In another embodiment, the AEC tuning module 375 may implement the threshold comparison (620, 630) and decide for itself whether the AEC 300 needs to be tuned.

The AEC tuning module may tune the AEC 300 using a variety of different methods. An example of tuning could be that an AEC 300 solution has several possible levels of aggressiveness in its Residual Echo Removal Submodule 135. In this example, the aggressiveness could be how much excessive residual echo attenuation is applied by submodule 135. Another example of tuning would be the adaptation speed of the adaptive filter in the AEC 300. The tuning could be to increase/decrease that speed in order to achieve an echo-free AEC behavior. It is to be understood that any conventional method of tuning an AEC and any convention AEC 300 are within the scope of disclosure and claims herein.

Figure 4:
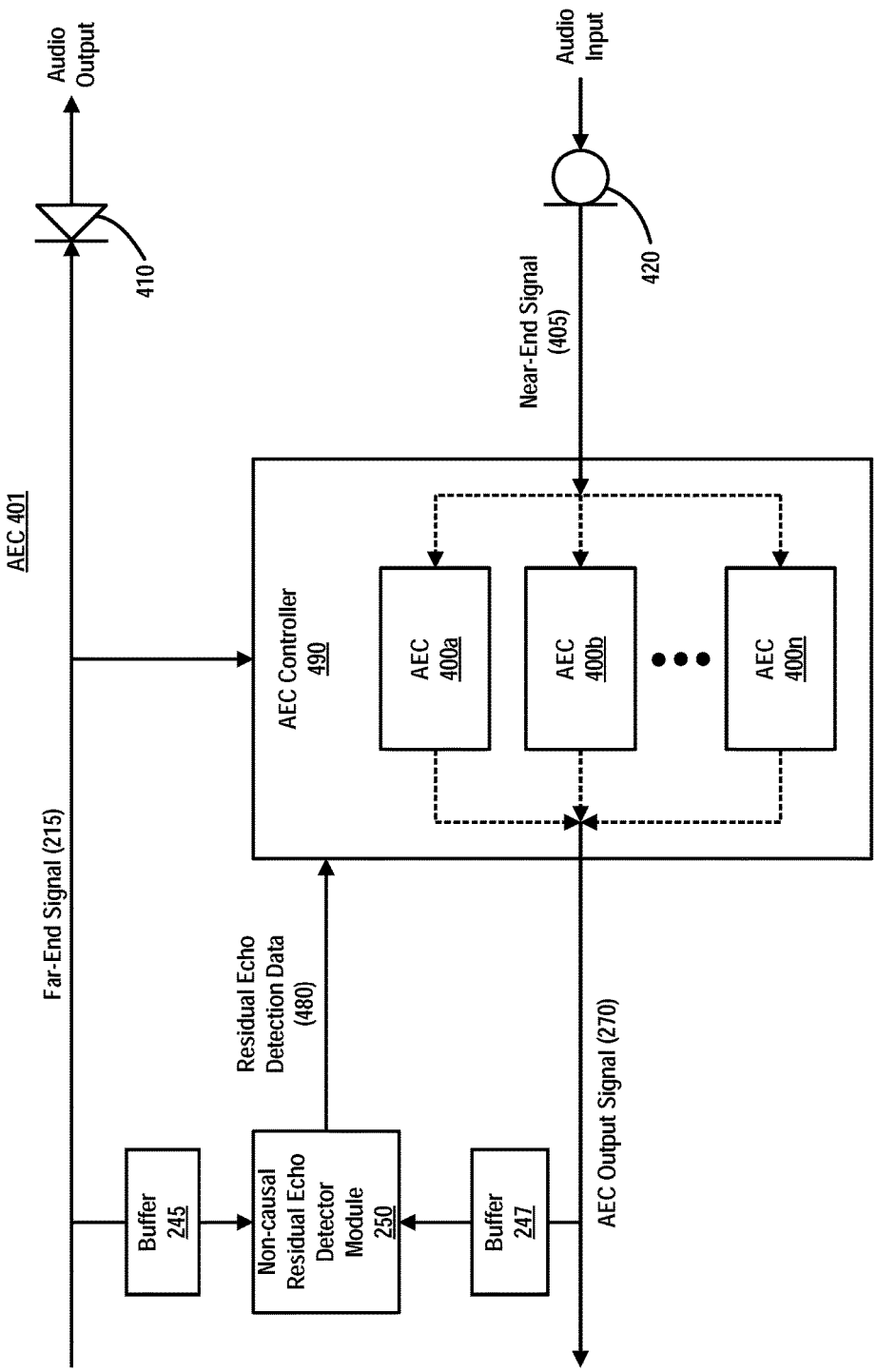
FIG. 4 is a block diagram illustrating an example system for acoustic echo cancellation using residual echo detection data with multiple echo cancellers according to one or more embodiments described herein.

FIG. 4 shows an example system for acoustic echo cancellation system 401 in which a non-causal residual echo detector 250 provides residual echo detection/presence data 480 that may be used to switch between multiple causal acoustic echo cancellers 400*a*, 400*b* . . . 400*n* in accordance with one or more embodiments described herein. It is to be understood that there may be only two causal acoustic echo cancellers 400*a*, 400*b* and that it is not necessary to have n such causal echo cancellers.

The causal AECs 400*a-n* are mutually distinct from one another such that selection between them will result in a different echo cancellation result. The AEC controller 490 uses the residual echo detection data 480 to decide which causal AEC 400*a-n* should be selected in order to improve the echo cancellation result.

Although AEC solutions differ in many aspects one non-limiting example may be as follows. Assume that there are two AECs available: A and B which are illustrated in FIG. 4 as AEC 400a and AEC 400b. A is really good in scenarios where the echo path is linear and achieves really good quality in those cases. If the echo path is not linear, it may, however, leak echoes. B on the other hand, gives worse quality in the output, but is able to handle nonlinear echoes in a good manner and does not leak any echo. For that setup, it could be good to start with AEC A, and let the detector determine if there are echo leakage when A is used, and in that case switch to using B.

Another more pragmatic example would be that two (or more) AEC solutions have been purchased/created (e.g. AEC 400a and AEC 400b) and no one knows how well they work. In order to make the system more robust, both are installed, and the residual echo detector 301 is used to switch between these if any of the AECs would start failing.

In one embodiment of FIG. 4, the non-causal residual echo detection module 250 implements the process of FIG. 6A such that if the estimated value satisfies the threshold (630) then the AEC controller 490 is notified, via data 480 to select a different AEC 400a-n. In another embodiment, the AEC controller 490 may implement the threshold comparison (630) and decide for itself whether a different AEC 400a-n should be selected. In other embodiments, the non-causal residual echo detection module implements the process of FIG. 6B such that switching (641) the AEC is based on the likelihood of echo presence value.

Figure 5:
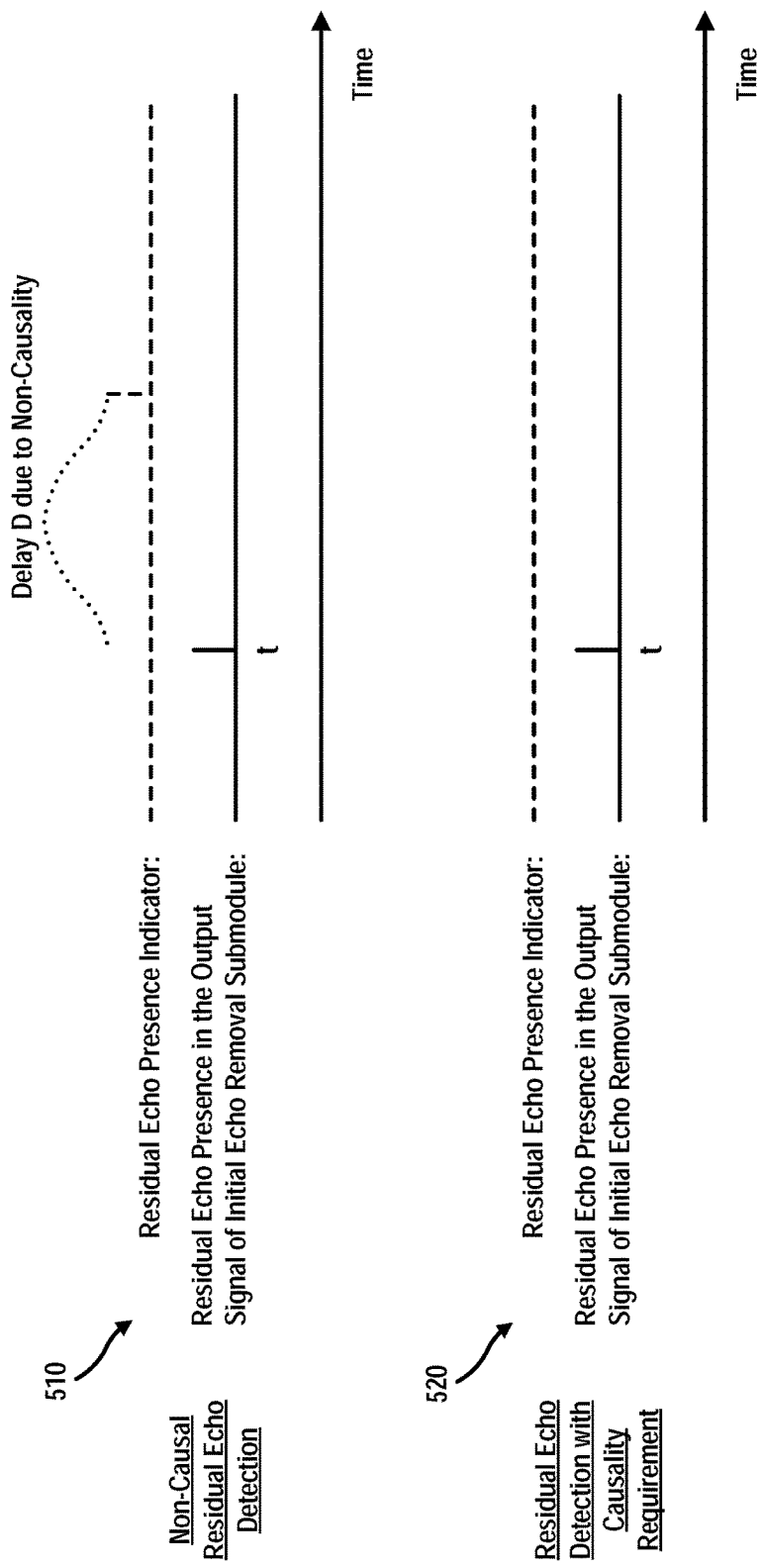
FIG. 5 is a graphical representation illustrating example timing for residual echo detection with and without a causality requirement according to one or more embodiments described herein.

FIG. 5 illustrates a hypothetical scenario to highlight some example differences between performing residual echo detection with and without a causality requirement.

Consider that at a time, t, residual echo is present in the output of the initial echo removal submodule (e.g., Initial Echo Removal Submodule 230 of AEC 200 as shown in FIG. 2). In the scenario 520, where residual echo detection is performed with the causality requirement, the residual echo is such that the residual echo detector submodule in the AEC (e.g., Residual Echo Detector Submodule 240 of AEC 200 as shown in FIG. 2) cannot detect the residual echo.

On the other hand, in the scenario 510, where residual echo detection is performed without the causality requirement (in a non-causal manner), the residual echo detector module (Residual Echo Detector Module 250, placed outside the AEC 200 as shown in FIG. 2) is able to use the non-causality to provide an assessment of residual echo being present in the output of the AEC. The non-causality does, however, cause that assessment to arrive D time units after the echo was present.

Figure 6B:
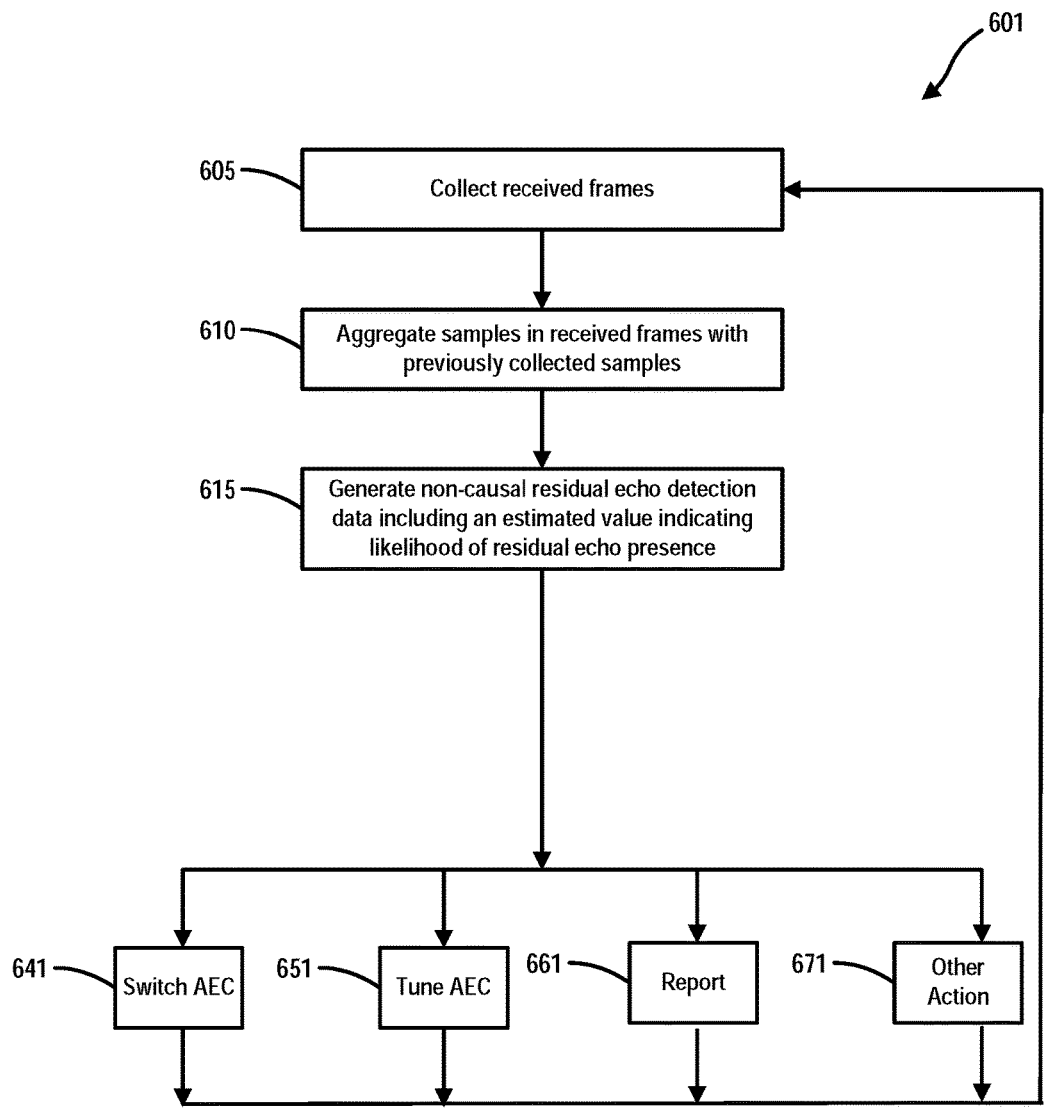
FIG. 6B is a flowchart illustrating another example method for non-causal residual echo detection according to one or more embodiments described herein.

FIG. 6B is a high-level flowchart illustrating an alternative embodiment for detecting residual echo and acting upon the detected residual echo. The process (601) illustrated in FIG. 6B may be performed by the non-causal echo detector module 250 and shares many of the same process steps as the process (601) illustrated in FIG. 6A. As such, descriptions of the shared process steps (605, 610 and 615) are omitted for brevity. A difference between process 600 and process 601 is that process 601 eliminates the threshold decision process steps (620 and 630) such that the process 601 performs an action based on the estimated value indicating likelihood of residual echo presence (and without using a threshold).

Tuning (642) the AEC may use a linear combination of different AECs, where the weights applied to at least one of the AEC is changed based on the value of the residual echo detector (the likelihood of residual echo presence).

Moreover, various ways of performing an action (switching (641), tuning (642) the AEC, reporting (661) and other actions (671) may be triggered or based on whether the generation of non-causal residual echo detection data returns a value at all (e.g. echo, if it throws an exception: no echo).

Figure 7:
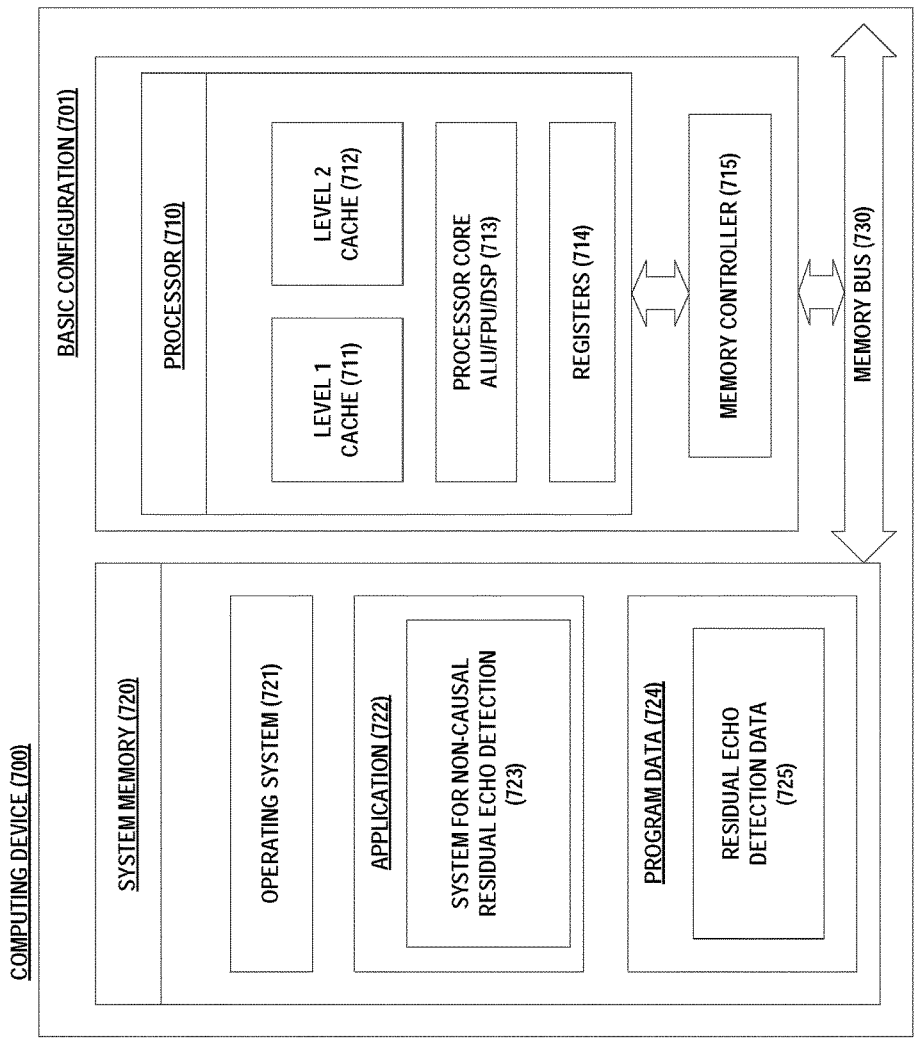
FIG. 7 is a block diagram illustrating an example computing device arranged for non-causal residual echo detection according to one or more embodiments described herein.

FIG. 7 is a high-level block diagram of an exemplary computer (700) arranged for non-causal residual echo detection, according to one or more embodiments described herein. In accordance with at least one embodiment, the non-causal residual echo detector module 250 may be implemented with a computer (700) that may be configured to perform residual echo detection on the output of an AEC as further explained in reference to FIGS. 6 and 9. As explained above, some of the functions illustrated by these flowcharts may be performed by the AEC tuning module 375 and/or AEC controller 490. Moreover, the AEC tuning module 375 and AEC controller 490 may be implemented using the exemplary computer 700.

In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (µP), a microcontroller (µC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (715) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include System for Non-Causal Residual Echo Detection (723) for performing residual echo detection on one or more AEC output signals without a causality requirement, in accordance with one or more embodiments described herein with particular reference to the flowcharts of FIGS. 6 and 9. Program Data (724) may include storing instructions that, when executed by the one or more processing devices, implement a method for non-causal residual echo detection.

Additionally, in accordance with at least one embodiment, program data (724) may include residual echo detection data (725), which may include data about the assessment of residual echo presence in the output of an AEC. In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory computer readable medium used to actually carry out the distribution. Examples of a non-transitory computer readable medium include, but are not limited to, the following: a recordable type medium such as, a hard disk drive, flash drive, a Compact Disc (CD), a Digital Video Disk (DVD), a digital tape, a computer memory, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The systems and methods discussed herein do not require collection or usage of user personal information. In situations in which certain implementations may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A computer-implemented method of detecting a residual echo from an acoustic echo canceller (AEC) receiving near-end audio samples output from the AEC and far-end audio samples, comprising:
    collecting received frames of the far-end audio samples and the near-end audio samples from the AEC, said collecting step collecting received frames of the far-end audio samples and the near-end audio samples over a time window, wherein the time window is from 500 ms to 60 seconds;
    aggregating the received frames of the far-end and near-end audio samples with previously collected frames of the far-end and near-end audio samples;
    generating an estimated value indicating a likelihood of residual echo presence in the AEC output audio samples output from the acoustic echo canceller using a non-causal echo detector in which the estimated value is generated after a residual echo was present in the near-end samples from the AEC; and
    performing an action based on the estimated value indicating likelihood of residual echo presence,
    said aggregating step respectively aggregating the received frames of the far-end and near-end audio samples with previously collected frames of the far-end and near-end audio samples into a representative value for each of the respective frames of the far-end and near-end samples,
    said generating step cross-correlating the representative values of the respective frames, and
    wherein the cross-correlation is between a) the far-end audio samples and residual audio samples; b) down-sampled variants of the far-end audio samples and residual audio samples; c) average signal powers of the far-end audio samples and residual audio samples; d) down-sampled powers of the far-end audio samples and residual audio samples; e) activity indicators for the far-end audio samples and residual audio samples; or f) high-pass filtered far-end audio samples and residual audio samples.

2. The computer-implemented method of claim 1, said generating step including:
    converting the aggregated frames of the far-end and near-end audio samples to a frequency domain having frequency sub-bands;
    weighting at least one of the frequency sub-bands of the aggregated near-end audio samples with a weighting value; and cross-correlating the weighted frequency sub-bands of the aggregated near-end audio samples with frequency sub-bands of the far-end audio samples.

3. The computer-implemented method of claim 1, said performing an action based on the estimated value indicating likelihood of residual echo presence including:
comparing the estimated value indicating likelihood of residual echo presence with a threshold; and
performing an action in response to the estimated value indicating likelihood of residual echo presence satisfying the threshold.

4. The computer-implemented method of claim 3, wherein the action performed in response to the estimated value indicating likelihood of residual echo presence satisfying the threshold includes tuning the acoustic echo canceller.

5. The computer-implemented method of claim 3, the acoustic echo canceller including at least a first and a second acoustic echo canceller,
wherein the action performed in response to the estimated value indicating likelihood of residual echo presence satisfying the threshold includes switching from the first to the second acoustic echo canceller.

6. The computer-implemented method of claim 3, wherein the action performed in response to the estimated value indicating likelihood of residual echo presence satisfying the threshold includes logging at least the estimated values indicating a likelihood of residual echo presence in the residual audio samples output from the acoustic echo canceller.

7. The computer-implemented method of claim 6, wherein the logging also includes reporting at least the estimated values indicating a likelihood of residual echo presence in the residual audio samples output from the acoustic echo canceller.

8. The computer-implemented method of claim 1, wherein the action does not include suppressing the residual echo.

9. The computer-implemented method of claim 1, further comprising:
continuing said collecting, aggregating, generating, comparing and performing steps on a continuous, periodic or a-periodic basis.

10. An apparatus for detecting a residual echo from an acoustic echo canceller (AEC) receiving near-end audio samples output from the AEC and far-end audio samples, comprising:
one or more processors; and
a non-transitory computer-readable medium coupled to said one or more processors having instructions stored thereon that, when executed by said one or more processors, cause said one or more processors to perform operations comprising:
collecting received frames of the far-end audio samples and the near-end audio samples from the AEC, said collecting step collecting received frames of the far-end audio samples and the near-end audio samples over a time window from 500 ms to 60 seconds;
aggregating the received frames of the far-end and near-end audio samples with previously collected frames of the far-end and near-end audio samples;
generating an estimated value indicating a likelihood of residual echo presence in the AEC output audio samples output from the acoustic echo canceller using a non-causal echo detector in which the estimated value is generated after a residual echo was present in the near-end samples from the AEC; and
performing an action based on the estimated value indicating likelihood of residual echo presence,
said aggregating step respectively aggregating the received frames of the far-end and near-end audio samples with previously collected frames of the far-end and near-end audio samples into a representative value for each of the respective frames of the far-end and near-end samples,
said generating step cross-correlating the representative values of the respective frames, and
wherein the cross-correlation is between a) the far-end audio samples and residual audio samples; b) down-sampled variants of the far-end audio samples and residual audio samples; c) average signal powers of the far-end audio samples and residual audio samples; d) down-sampled powers of the far-end audio samples and residual audio samples; e) activity indicators for the far-end audio samples and residual audio samples; or f) high-pass filtered far-end audio samples and residual audio samples.

11. The apparatus of claim 10, said generating step including:
converting the aggregated frames of the far-end and near-end audio samples to a frequency domain having frequency sub-bands;
weighting at least one of the frequency sub-bands of the aggregated near-end audio samples with a weighting value; and
cross-correlating the weighted frequency sub-bands of the aggregated near-end audio samples with frequency sub-bands of the far-end audio samples.

12. The apparatus of claim 10, said performing an action based on the estimated value indicating likelihood of residual echo presence including:
comparing the estimated value indicating likelihood of residual echo presence with a threshold; and
performing an action in response to the estimated value indicating likelihood of residual echo presence satisfying the threshold.

13. The apparatus of claim 12, wherein the action performed in response to the estimated value indicating likelihood of residual echo presence satisfying the threshold includes tuning the acoustic echo canceller.

14. The apparatus of claim 12, the acoustic echo canceller including at least a first and a second acoustic echo canceller,
wherein the action performed in response to the estimated value indicating likelihood of residual echo presence satisfying the threshold includes switching from the first to the second acoustic echo canceller.

15. The apparatus of claim 12, wherein the action performed in response to the estimated value indicating likelihood of residual echo presence satisfying the threshold includes logging at least the estimated values indicating a likelihood of residual echo presence in the residual audio samples output from the acoustic echo canceller.

16. The apparatus of claim 15, wherein the logging also includes reporting at least the estimated values indicating a likelihood of residual echo presence in an the residual audio samples output from the acoustic echo canceller.

17. The apparatus of claim 10, wherein the action does not include suppressing the residual echo.

18. The apparatus of claim 10, wherein the one or more processors are caused to perform further operations comprising:

continuing said collecting, aggregating, generating, comparing and performing steps on a continuous, periodic or a-periodic basis.

\* \* \* \* \*